Dec. 1, 1959  J. E. BIGELOW  2,915,630
PULSE REVERTER
Filed Oct. 6, 1955  2 Sheets-Sheet 1

*INVENTOR:—*
JOHN E. BIGELOW
BY:—
*Junius F. Cook, Jr.*
ATTORNEY

Dec. 1, 1959 J. E. BIGELOW 2,915,630
PULSE REVERTER
Filed Oct. 6, 1955 2 Sheets-Sheet 2
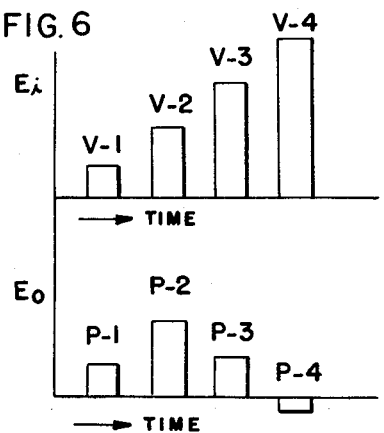
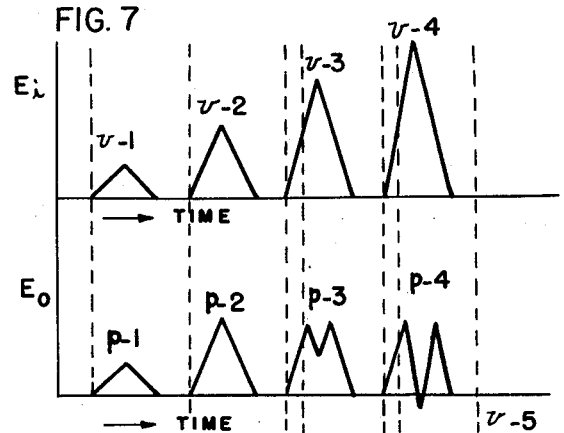
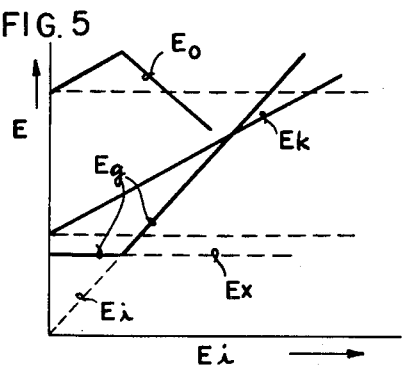
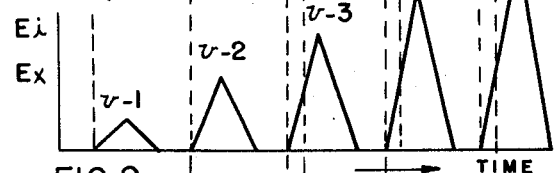
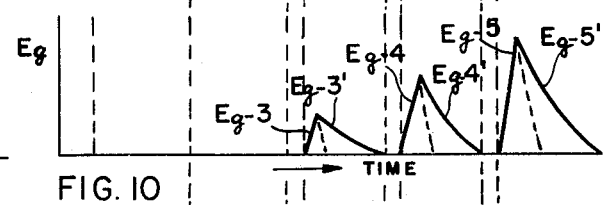
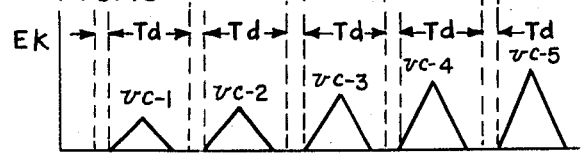
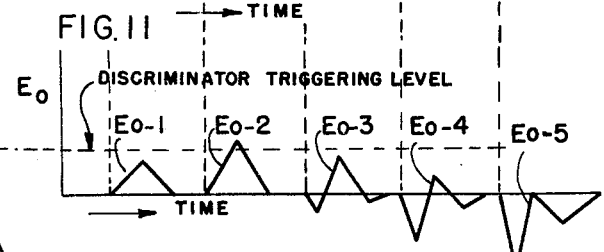
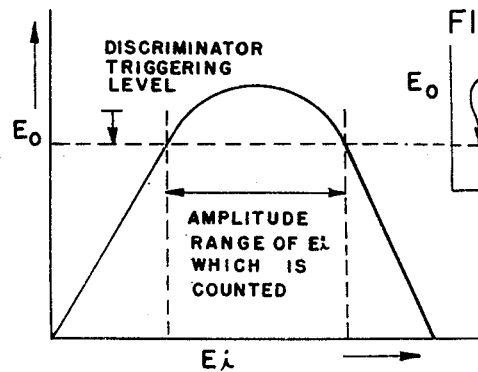
INVENTOR:—
JOHN E. BIGELOW
BY:—
Junius F. Cook, Jr.
ATTORNEY United States Patent Office 2,915,630
Patented Dec. 1, 1959

2,915,630

PULSE REVERTER

John E. Bigelow, Hales Corners, Wis., assignor to General Electric Company, a corporation of New York Application October 6, 1955, Serial No. 538,860

5 Claims. (Cl. 250—27)

The present invention relates in general to electronics, and has more particular reference to electrical translation, the invention more especially pertaining to an improved pulse reverter operable to translate an electrical signal having an output energy level which increases as a function of increasing energy input up to a selected level and thereafter decreases with further increase in input energy.

It is frequently desirable, when employing proportional counters or scintillation counters for radiation detecting purposes, to be able to select and count only such pulses as fall within a selected energy range, as, for example, a range which may include pulses produced by the energy of a single photon, such as the energy of a characteristic radiation line obtained by the diffraction of radiant energy. Equipment embodying discriminator circuits adjusted at selected levels and gating circuits operable at upper energy levels, whereby pulses which trigger both upper and lower discriminator circuits may be prevented from passing through the gating circuits, is presently available for pulse selecting purposes. Such equipment, however, comprises involved and exceedingly complex electrical translation circuitry and consequently is excessively costly.

An important object of the present invention is to provide relatively simple and hence inexpensive pulse selection equipment of the character mentioned; a further object being to provide a pulse reverter system comprising a minimum number of electron flow devices and interconnecting circuitry forming a translation system of relative simplicity adapted for manufacture at low cost; a still further object being to provide a pulse reverting system embodying but three electron flow triodes and simple circuitry.

Another important object resides in utilizing the pulse reverter of the present invention in combination with a discriminator device adjusted so that only those pulses delivered by the reverter at energy levels in excess of a selected value will trigger the discriminator, whereby the proportional width of the energy pulsations to be counted can be determined by adjusting the operating level of the discriminator.

Another important object is to provide a pulse reverter, and a counter tube with means for adjusting its counting range by changing the operating potential applied to the tube, to thereby adjust the apparatus for the counting of photons having energy levels within the energy range to which the tube is adjusted.

Briefly stated, in accordance with one aspect of the invention, the pulse reverter comprises a translation system embodying a pulse reverting electron flow device having a control grid upon which input pulsations are applied, through a biased diode which serves to prevent low energy level signal pulsations from passing to the control grid. The translation system, however, provides for the application of low as well as high level signal pulsations upon the cathode of the electron flow device, thereby driving the cathode positive, and, in turn, producing a positive going signal at the plate of the electron flow device.

When an applied signal pulsation exceeds the diode bias, a positive signal is passed to the grid of the electron flow device, thereby overcoming the effect of the positive going cathode and causing the anode potential to revert and go negative.

This invention contemplates the connection of a delay line in the circuit, through which signal pulsations are passed to the cathode of the electron flow device while connecting a shunt capacitor between ground and the control grid of the electron flow device, to provide for the slow decay of pulsations applied on said grid.

The output side of the electron flow device may be connected to control the operation of an electron flow relay tube, by means of which the reverted signal may be applied, as through a shielded conductor, to an associated discriminator system of conventional character operable only in response to the application thereto of signals of energy value in excess of the level to which the discriminator shall have been adjusted. Pulsations to be counted also may be delivered through an electron flow amplifier to the diode and the delay line for application upon the control grid and cathode of the pulse reverting electron flow device.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Figs. 5, 6 and 7 are graphical representations of voltage conditions which prevail in the circuits shown in Fig. 4; and Figs. 8, 9, 10, 11 and 12 are graphical representations of voltage conditions which prevail in the circuits shown in Fig. 3 and in the corresponding portions of the system shown in Fig. 2.

Figure 1:
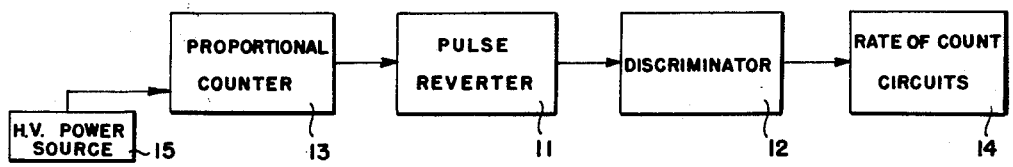
Fig. 1 is a block diagram illustrating an electronic counting system comprising a selected environment in which the pulse reverter of the present invention may be advantageously utilized.

To illustrate the invention the drawings show a pulse reverter system 11 well suited for use in conjunction with proportional counters or scintillation counters, but which, of course, may have other application wherever pulse reversion may be employed to advantage in electrical translation systems. When used as a part of a pulse counting network as shown in Fig. 1, the reverter system 11 may be interconnected with a discriminator 12 of any suitable or preferred character in order that energy pulsations, applied on the pulse reverter system from a proportional counter 13 of any preferred sort, may be delivered to the discriminator 12 whereby to cause operation of a scaler or ratemeter 14 of any preferred type. The counter device 13 may be energized from a variable voltage source 15 adjustable to condition the counter for operation within a desired counting range. The discriminator 12 may comprise a triggering circuit which will actuate the scaler 14 as a load in response to the transmission of a signal of size greater than the critical value for which the discriminator is adjusted.

The function of the reverter is to deliver a signal, in response to energy pulses applied by the proportional counter 13, which signal increases in intensity up to a selected level and thereafter decreases in response to progressively increasing intensity in the signal applied to the reverter from the counter 13. As a consequence, by adjusting the discriminator for operation in response to signals at and above an energy level but slightly below the maximum energy level of signals delivered by the reverter, it will be seen that the ratemeter will function only in response to signals having energy levels between closely defined upper and lower limits and will not respond either to signals having energy levels above said upper limit, determined by the operating characteristics of the reverter, or below the lower limit determined by adjustment of the discriminator.

Figure 2:
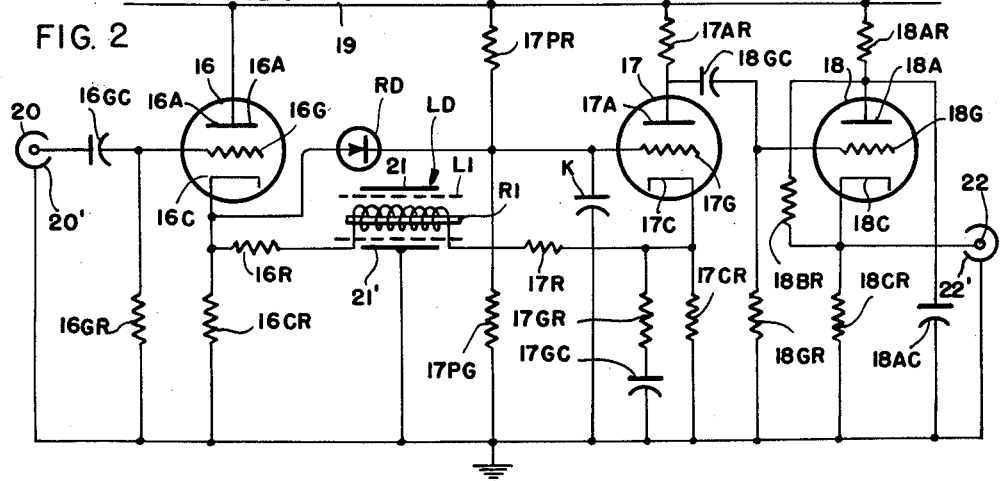
Fig. 2 is a diagram of electrical connections and components comprising a pulse reverter embodying the present invention.

To these ends, the pulse reverter system 11, as shown more particularly in Fig. 2 of the drawings, comprises electron flow devices or valves 16, 17 and 18, respectively having anodes 16A, 17A and 18A, cathodes 16C, 17C and 18C, and control grids 16G, 17G and 18G. The anodes of said devices are connected with a suitable source 19 of unidirectional electrical potential, as, for example, a source of potential of the order of 250 volts, the anode 16A in the illustrated embodiment being connected directly with said source, the anodes 17A and 18A being respectively connected with said source through resistors 17AR and 18AR. The cathodes of the devices 16, 17 and 18 are connected to ground, respectively through resistors 16CR, 17CR and 18CR.

The control grid of the device 16 is connected through a condenser 16GC with a conductor 20 enclosed in a grounded shield 20′, the conductor 20 being adapted for connection with the output side of the pulse emitting device 13. Accordingly, pulsations delivered by the device 13 are applied upon the control grid 16G of the electron flow valve 16 through the condenser 16GC, the grid 16G being preferably connected to ground through a resistor 16GR.

The cathode 16C of the valve 16 is connected with the control grid 17G of the valve 17 through a rectifying diode RD, said cathode 16C being also connected with the cathode 17C of the valve 17 through a delay line component LD. This delay line component may comprise a coiled electrical conductor 21 wound upon a support, such as a rod of insulating material RI, and enclosed within a layer of insulation LI, a grounded shield 21′ comprising a sleeve of electrical conducting material enclosing the coil 21 outwardly of the insulating sleeve LI. The delay line component LD serves to retard, or delay, the transfer of a signal voltage pulsation between the cathodes of the valves 16 and 17; and any combination of resistance capacitance and inductance that will provide the desired delay in signal transfer may be employed as a delay line system, in place of the specific component shown. The opposite ends of the coil 21 are electrically connected respectively with the cathodes 16C and 17C through resistors 16R and 17R. If desired, the cathode 17C of the valve 17 may also be connected to ground through a resistor 17GR and a condenser 17GC connected in series.

Figure 3:
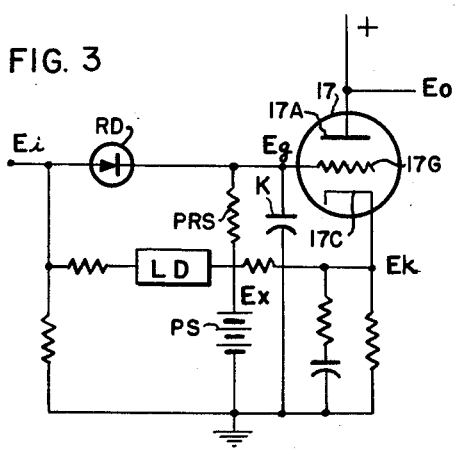
Fig. 3 is a simplified version of a portion of the diagram comprising Fig. 2.

Any suitable or preferred potential applying means may be provided for electrically biasing the control grid 17G with respect to ground, as by connecting said grid to the potential source 19 as through a resistor 17PR, and by connecting the grid to ground, as through a resistor 17PG. The grid 17G is also connected to ground through a condenser K. Alternatively, as shown in Fig. 3, the means for biasing the grid 17G may comprise a unidirectional potential source PS and resistor PSR connected in series between ground and the grid.

The anode 17A of the valve 17 is controllingly connected with the grid 18G of the valve 18 by means of a coupling condenser 18GC, the control grid 18G being also connected to ground, as through a resistor 18GR. The anode 18A of the valve 18 is preferably connected to ground through a condenser 18AC, and a conductor 22 enclosed in a grounded shield 22′ is provided for connecting the cathode 18C of the valve 18 with the discriminator device 12. The valve 18 is thus adapted to function as a relay for actuating the discriminator in response to signals delivered by the valve 17. The cathode and anode of the valve 18 are interconnected through a ballast resistor 18BR.

In the translation system shown in Fig. 2, pulse reversion is accomplished by means of the valve 17 and the circuitry embodying the rectifying diode RD and the delay line component LD. In order to explain the manner in which pulse reversion is accomplished, Fig. 3 depicts a simplified version of the valve 17 and the associated pulse reverting portions of the system, while Fig. 4 depicts the circuitry shown in Fig. 3 with the delay line LD and the condenser K omitted.

Figure 4:
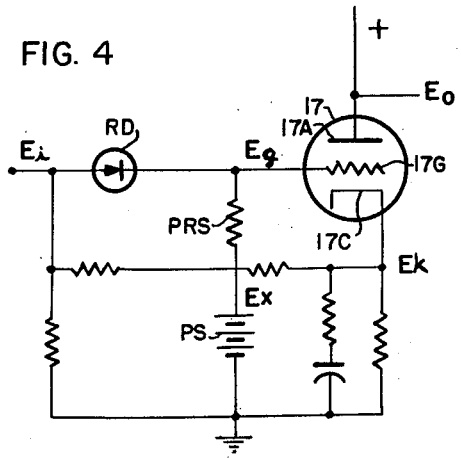
Fig. 4 is a variant circuit arrangement comparable with that shown in Fig. 3.

The graphs depicted in Fig. 5 show the various voltage relationships which prevail in the pulse reverting system illustrated in Fig. 4, in response to variations in the voltage of signal impulses applied between ground and the input side of the rectifying diode RD. As shown in Fig. 5, the dashed line $Ex$ represents the bias voltage maintained upon the grid 17G of the electron flow valve. The dashed line $Ei$ represents progressively increasing signal input voltage, so that the solid line $Eg$ represents the voltage with respect to ground that is applied to the control grid 17G of the electron flow device as signal input voltage with respect to ground progressively increases. The solid line $Ek$ represents the voltage which prevails at the cathode 17C of the electron flow valve in response to progressively increasing signal input voltage with respect to ground. The solid line $Eo$ represents output voltage with respect to ground which prevails at the anode 17A of the electron flow device in response to progressively increasing signal input voltage.

It will be seen that output voltage $Eo$ progressively increases with increasing input voltage $Ei$ until input voltage becomes equal to the bias voltage with respect to ground which is maintained upon the grid 17G. Thereafter, the output voltage $Eo$ proportionally decreases with increase of input voltage. The foregoing result is produced by the action of the rectifying diode which, in conjunction with the source of grid biasing power, prevents signals having voltage below the value of grid bias from reaching the grid, thereby permitting signals initially delivered to the cathode to be transmitted to the plate, during the interval before input signal becomes sufficiently large to offset grid biasing voltage. In this connection, the input energy pulsation is attenuated by the ground resistors and applied to the cathode 17C, so that a plus or positive voltage will appear at the cathode and at the plate of the valve 17 in response to the application of an input pulsation of plus or positive character. As the potential of the input signal impulse increases above the grid biasing voltage, an impulse of corresponding intensity is applied to the grid through the diode RD. Since such impulse applied to the grid is not attenuated, the effect of the potential thus applied at the grid will be greater than that of the potential applied at the cathode. As a consequence, the voltage of the signal delivered through the anode of the valve 17 with increasing intensity of signal input first increases in a positive direction, then reverts to its starting value, and finally proceeds in a negative direction. In other words, increase in signal voltage above grid biasing potential results in the application of progressively increasing potential upon the grid 17G, thereby progressively reducing the potential applied upon the anode 17A and producing the result illustrated by the graph $Eo$ in Fig. 5.

Fig. 6 illustrates signal input voltage pulsations V–1, V–2, V–3, V–4 of progressively increasing intensity and of theoretical perfectly square character, and corresponding output voltage pulsations P–1, P–2, P–3, P–4 showing the intensity level of such output pulsations increasing to a maximum value at P–2 corresponding with an input signal impulse intensity at V-2, the energy level of output pulsations decreasing, as at P-3 and P-4, in response to input pulsations V-3 and V-4 of progressively increased voltage.

It is impossible in actual practice to obtain the ideal square wave form of energy pulsations, the actual shape of input energy pulsations being peaked, as shown at v-1, v-2, v-3, v-4, in Fig. 7, that is to say, each energy pulsation shows progressively increasing voltage intensity to a peak value, after which the voltage progressively decreases. As a consequence, the corresponding output voltage pulsations p-1, p-2, p-3, p-4 will not show the perfectly flat wave top illustrated in Fig. 6, but will have a serrated configuration in which the voltage peaks extend above the desired maximum level illustrated at P-2 in Fig. 6. As shown at p-3 and p-4, output voltage increases with input voltage to a first peak where output voltage reverts, as shown in Fig. 5, after which output voltage decreases with increase of input voltage until input voltage reaches a maximum and starts to decline during the terminal portions of the input energy pulsation. As input voltage thus declines, output voltage must follow the curve Eo in Fig. 5 in the reverse direction, and consequently output voltage increases to the second peak, as shown at p-3 and p-4 in Fig. 7.

It will be seen that the serrated character of pulsations of the sort shown at p-3 and p-4 in Fig. 7 can be but difficultly applied for the purpose of triggering the associated discriminator 12 at a particular voltage level without triggering it either below or above such level. No difficulty, of course, would be encountered in triggering the discriminator if the perfectly square wave form of pulsations illustrated at P-3 and P-4 in Fig. 6 could be obtained. The present invention, however, provides simple, inexpensive yet entirely reliable means for triggering the controlled discriminator 12 at a precisely determined signal energy level. This is accomplished by providing delay line means, such as the component LD in the circuit through which the signal pulsations are delivered to the cathode 17C, and by connecting the grid 17G to ground through the condenser K. The delay line means serves to delay or retard the application of signal voltage pulsation on the cathode of the valve 17, while the condenser K operates to retard the decay of grid voltage after a voltage peak is reached, whereby grid voltage declines more slowly than does the voltage of signal impulses applied at the input.

Fig. 8 illustrates signal input voltage pulsations v-2, v-3 and v-4, comparable with the similarly identified pulsations in Fig. 7, and a pulsation v-5 of somewhat greater intensity. As a result of the inclusion of the delay line component LD and of the grid connected condenser K in the system, grid voltage in excess of bias voltage, as shown more particularly in Fig. 9, will increase as a proportional function of signal voltage, as shown at Eg-3, Eg-4, Eg-5; but after the peak value of the input voltage pulsation has been reached and passed, grid voltage will decline, as shown at Eg-3', Eg-4' and Eg-5', much more slowly than does the voltage of the input energy pulsation.

As shown in Fig. 10, the voltage pulsations vc-2, vc-3, vc-4 and vc-5 applied upon the cathode 17C in response to the input voltage pulsations v-2, v-3, v-4 and v-5, are retarded behind the corresponding input voltage pulsations by a time delay interval Td because of the action of the delay line LD. Since the potential of the signal delivered at the output of the pulse reverter is a proportional function of the difference between the potentials prevailing at the cathode and grid, the voltage pulsations delivered by the pulse reverter circuit, corresponding with the input voltage pulsations v-2, v-3, v-4 and v-5, are shown respectively at Eo-2, Eo-3, Eo-4 and Eo-5 as a subtraction of the voltage values shown in Fig. 9 from the values shown in Fig. 10; and it will be seen that after the peak output voltage value is reached at Eo-2 in Fig. 11, all subsequent peak voltage values of the pulsations Eo-3, Eo-4 and Eo-5, corresponding with increased signal input peak voltage values v-3, v-4 and v-5, are progressively lower than the peak value of the pulsation Eo-2. Accordingly, if the discriminator 12 be adjusted to trigger in response only to the peak value of the pulsation Eo-2, it will be seen that the system will be responsive only to input signal pulsations having precisely the energy value to produce the output pulsation of maximum voltage, and will not respond to input signal pulsations having energy levels either above or below the selected energy level.

While the present invention is not necessarily limited to the values of resistance, inductance or capacitance of the circuit components, nor to any specific type of electron flow valve, satisfactory performance has been attained where the valves 16, 17 and 18, in the system shown in Fig. 2, each comprise one-half of a 12BH7 valve, the rectifying diode being an IN34a type device, and wherein the circuit components embody impedance values as follows:

| COMPONENT: | Impedance value |
|---|---|
| Condensers 16GC, 18GC and 18AC | 0.01 mf. |
| Condenser 17GC | 50 mf. |
| Condenser K | 250 mmf. |
| Resistors 16GR, 17GR and 18GR | 470,000 ohms. |
| Resistors 16CR and 18CR | 1,000 ohms. |
| Resistor 17CR | 4,700 ohms. |
| Resistors 16R and 17R | 820 ohms. |
| Resistor 17PR | 68,000 ohms. |
| Resistor 17PG | 5,600 ohms. |
| Resistor 17AR | 15,000 ohms. |
| Resistor 18AR | 33,000 ohms. |
| Delay Line LD | 1,200 ohms.; 0.3 m. sec. |

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A translation system of the character described comprising an electron flow valve having anode, cathode and control grid, means for applying a positive bias potential at a selected level on said grid, a rectifying diode and a delay circuit for delivering peaked signal input pulsation components respectively on said grid and on said cathode, with the peak voltage values of said components displaced as to time, and a condenser connected to be effective in a circuit between the cathode and said grid to delay the reduction of grid voltage from a peak value thereof.

2. A translation system of the character described comprising an electron flow valve having anode, cathode and control grid, means for delivering peaked signal input pulsations on said grid through a rectifying diode and on said cathode through a delay circuit, whereby to develop corresponding output signal pulsations, at the anode of said valve, comprising a function of the differential of signal voltage components applied on said cathode and grid, with the peak voltage values of said components displaced as to time, a condenser connected in a circuit to be effective between said cathode and said grid to delay the reduction of grid voltage from a peak value thereof, and means for applying a bias potential at a selected level on said grid.

3. A translation system of the character described including a discriminator forming an operable load device adapted to be triggered at a selected signal energy pulse level peak, a pulse reverter controllingly connected with said discriminator to trigger the same in response to signals delivered by the reverter at a selected energy pulse level peak, said reverter comprising an electron flow valve having anode, cathode and control grid, means for delivering peaked signal input pulsations on said grid through a rectifying diode and on said cathode through a delay circuit, whereby to develop resultant output signal pulsations, at the anode of said valve, such resultant pulsations constituting a function of the differential of signal voltage components applied on said cathode and on said grid, a condenser connected in a circuit to be effective between said cathode and said grid to delay the reduction of grid voltage from a peak value thereof, and means for applying a bias potential at a selected level on said grid.

4. A translation system of the character described including a discriminator forming an operable load device adapted to be triggered at a selected signal energy pulse level peak, a pulse reverter comprising an electron flow valve having anode, cathode and control grid, means for delivering a signal input pulsation on said grid, through a rectifying diode and on said cathode through a delay circuit, whereby to develop a resultant output signal pulation at the anode of said valve as a function of the difference of the effects of the cathode and of the grid potentials, a condenser connected in a circuit effectively between said cathode and said grid to delay the reduction of grid voltage from a peak value thereof, means for applying a bias potential at a selected level on said grid, and relay means controllingly connected with said reverter and with said discriminator to trigger the discriminator in response to signals delivered by the reverter at a selected energy level.

5. A translation system of the character described including a discriminator forming an operable load device adapted to be triggered at a selected signal energy level, a pulse reverter controllingly connected with said discriminator to trigger the same in response to signals delivered by the reverter at a selected energy pulse level peak, said reverter comprising an electron flow valve having anode, cathode and control grid, and means for delivering peaked signal input pulsations on said grid through a rectifying diode and on said cathode through a delay circuit, whereby to develop corresponding output signal pulsations, at the anode of said valve, comprising a function of the differential of signal voltage components applied on said cathode and grid.

References Cited in the file of this patent

UNITED STATES PATENTS

| | | |
|---|---|---|
| 2,446,613 | Shapiro | Aug. 10, 1948 |
| 2,579,473 | Chatterjea | Dec. 25, 1951 |
| 2,703,364 | Birnbaum | Mar. 1, 1955 |
| 2,706,810 | Jacobsen | Apr. 19, 1955 |